United States Patent
Park et al.

(10) Patent No.: US 12,533,660 B2
(45) Date of Patent: *Jan. 27, 2026

(54) CATALYST FOR HYDROGENATION REACTION AND METHOD FOR PRODUCING SAME

(71) Applicant: HANWHA SOLUTIONS CORPORATION, Seoul (KR)

(72) Inventors: Woo Jin Park, Daejeon (KR); Bong Sik Jeon, Daejeon (KR); Yong Hee Lee, Daejeon (KR); Eui Geun Jung, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 951 days.

This patent is subject to a terminal disclaimer.

(21) Appl. No.: 17/623,315

(22) PCT Filed: Jun. 25, 2020

(86) PCT No.: PCT/KR2020/008287
§ 371 (c)(1),
(2) Date: Dec. 28, 2021

(87) PCT Pub. No.: WO2020/262985
PCT Pub. Date: Dec. 30, 2020

(65) Prior Publication Data
US 2022/0362749 A1  Nov. 17, 2022

(30) Foreign Application Priority Data
Jun. 28, 2019  (KR) .......................... 10-2019-0078365

(51) Int. Cl.
*B01J 23/755* (2006.01)
*B01J 21/08* (2006.01)
(Continued)

(52) U.S. Cl.
CPC ............ *B01J 23/755* (2013.01); *B01J 21/08* (2013.01); *B01J 23/72* (2013.01); *B01J 27/02* (2013.01);
(Continued)

(58) Field of Classification Search
None
See application file for complete search history.

(56) References Cited

U.S. PATENT DOCUMENTS 4,452,951 A * 6/1984 Kubo .................. C08C 19/02
525/329.3
6,281,163 B1  8/2001 Van Dijk
(Continued)

FOREIGN PATENT DOCUMENTS

CN  1349433 A * 5/2002 ............ B01J 23/755
CN  1816392 A  8/2006
(Continued)

OTHER PUBLICATIONS

Machine translation of Wang et al., CN102451689A (Year: 2012).*
(Continued)

*Primary Examiner* — Keling Zhang
(74) *Attorney, Agent, or Firm* — Harvest IP Law, LLP

(57) ABSTRACT

The present invention relates to a catalyst for a hydrogenation reaction and a method for producing the same, and more specifically, to a catalyst for a hydrogenation reaction, wherein the catalyst includes nickel oxide as an active ingredient and copper oxide and sulfur oxide as a promoter, and especially, can control a reduction degree value according to whether or not a passivation layer of a nickel metal is removed.

12 Claims, 1 Drawing Sheet

(51) Int. Cl.
  *B01J 23/72* (2006.01)
  *B01J 27/02* (2006.01)
  *B01J 35/30* (2024.01)
  *B01J 35/40* (2024.01)
  *B01J 35/45* (2024.01)
  *B01J 35/61* (2024.01)
  *B01J 35/64* (2024.01)
  *B01J 35/77* (2024.01)
  *B01J 37/00* (2006.01)
  *B01J 37/02* (2006.01)
  *B01J 37/03* (2006.01)
  *B01J 37/04* (2006.01)
  *B01J 37/06* (2006.01)
  *B01J 37/08* (2006.01)
  *B01J 37/18* (2006.01)
  *C08F 8/04* (2006.01)

(52) U.S. Cl.
  CPC ............ *B01J 35/393* (2024.01); *B01J 35/40* (2024.01); *B01J 35/45* (2024.01); *B01J 35/615* (2024.01); *B01J 35/647* (2024.01); *B01J 35/77* (2024.01); *B01J 37/009* (2013.01); *B01J 37/0221* (2013.01); *B01J 37/0236* (2013.01); *B01J 37/035* (2013.01); *B01J 37/04* (2013.01); *B01J 37/06* (2013.01); *B01J 37/088* (2013.01); *B01J 37/18* (2013.01); *C08F 8/04* (2013.01); *C08F 2810/00* (2013.01)

(56) References Cited

U.S. PATENT DOCUMENTS 12,172,150 B2 *  12/2024  Park ....................... B01J 23/755
2020/0369794 A1 * 11/2020  Seo ........................ B01J 21/08

FOREIGN PATENT DOCUMENTS

| | | |
|---|---|---|
| CN | 101172237 A | 5/2008 |
| CN | 102407118 A | 4/2012 |
| CN | 102451689 A | 5/2012 |
| CN | 102451691 A | 5/2012 |
| CN | 104588024 A | 5/2015 |
| DE | 03049414 A1 | 9/1981 |
| EP | 3907001 A1 | 11/2021 |
| JP | 2002275212 A | 9/2002 |
| KR | 1020020024713 A | 4/2002 |
| KR | 1020090064455 A | 6/2009 |
| KR | 1020130051937 A | 5/2013 |
| KR | 1020160040177 A | 4/2016 |
| KR | 1020190017229 A | 2/2019 |
| WO | 9601691 A1 | 1/1996 |
| WO | 2015008247 A2 | 1/2015 |
| WO | WO-2019132398 A1 * | 7/2019 ............ B01J 21/08 |
| WO | 2019201618 A1 | 10/2019 |
| WO | 2020141705 A1 | 7/2020 |

OTHER PUBLICATIONS

Machine translation of Dufresne et al., CN1816392A (Year: 2006).*
Machine translation of Burk et al., CN 1349433A (Year: 2002).*
Machine translation of Eiji et al., JP2002275212A (Year: 2002).*
Hydrogenation of Dicyclopentadiene Resin and Its Monomer over High Efficient CuNi Alloy Catalysts, Zongxuan Bai et al., 2019 Wiley-VCH Verlag Gmbh & Co. KGaA, Weinheim, ChemistrySelect 2019, 4, pp. 6035-6042 DOI: 10.1002/slct.201900476.
Selective hydrogenation of 1,3_pentadiene over mono_ and bimetallic sulfidized Ni(Cu)—S/SiO2 catalysts, Russian Chemical Bulletin, International Edition, vol. 65, No. 12, pp. 2841-2844, Dec. 2016, pp. 2841-2844.
An Office Action issued on Aug. 1, 2023 in the corresponding Chinese Patent Application.
An Extended European Search Report issued on Sep. 22, 2023 in the corresponding European Patent.

* cited by examiner

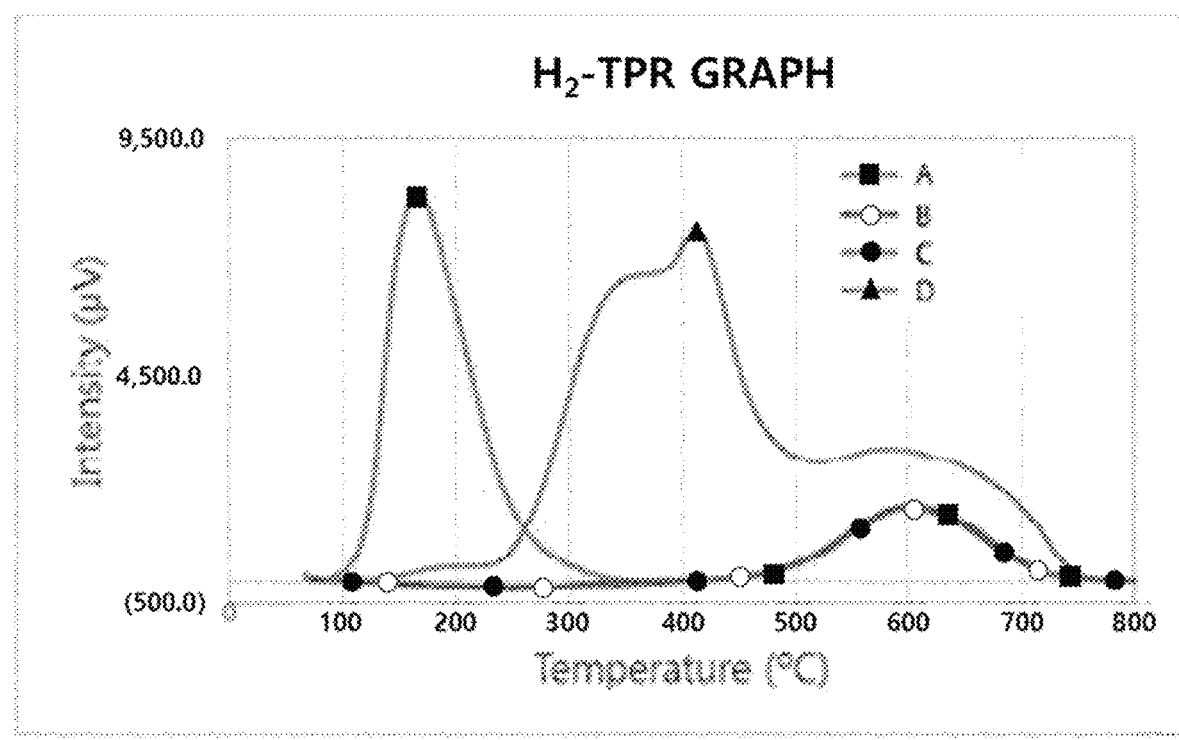

CATALYST FOR HYDROGENATION REACTION AND METHOD FOR PRODUCING SAME

CROSS-REFERENCE TO RELATED APPLICATIONS

This application is a National Stage of International Application No. PCT/KR2020/008287 filed Jun. 25, 2020, claiming priority based on Korean Patent Application No. 10-2019-0078365 filed Jun. 28, 2019.

TECHNICAL FIELD

The present invention relates to a catalyst for a hydrogenation reaction and a method for producing the same, and more specifically, to a catalyst for a hydrogenation reaction, wherein the catalyst includes nickel oxide as an active ingredient and copper oxide and sulfur oxide as a promoter (accelerator), and especially, can control a reduction degree value according to whether or not a passivation layer of a nickel metal is removed.

BACKGROUND ART

A hydrocarbon resin is a solid thermoplastic resin that is produced by separating and refining an olefin component including C5 and C9 from a mixture prepared by naphtha cracking and performing polymerization under heat or catalyst by using the olefin component as a raw material. In order to solve the general weak quality problems of a hydrocarbon resin such as heat resistance, light resistance, odor, color quality, and toxicity, a hydrocarbon resin is converted into a colorless, odorless, and high-quality resin by adding hydrogen at high temperature and high pressure and performing a stabilization process thereon. Therefore, a hydrogenation catalyst is essential in a hydrocarbon resin hydrogenation process.

In general, a hydrogenation catalyst for a hydrocarbon resin is applied in the form of supporting a noble metal such as palladium, platinum, and rhodium or a transition metal such as nickel and cobalt on silica, alumina, activated carbon, titania, or the like.

A nickel (Ni)-based catalyst has an advantage of high activity in a hydrogenation reaction, compared with catalysts including other transition metals. In addition, in order to secure the activity of the catalyst in the hydrocarbon resin hydrogenation reaction, nickel is preferably included in an amount of at least 40 wt %. In a case in which nickel is supported on a carrier, as the nickel content increases, dispersibility decreases, resulting in an increase in the size of nickel crystals and reducing the activity of the catalyst accordingly. If the nickel content is lowered so as to prevent the above problem, dispersibility is relatively improved, but activity is reduced. Therefore, it is necessary to support a high content of nickel and also maintain a crystallite size of nickel at an appropriate level. In addition, in the case of nickel, it is difficult to use for the selective hydrogenation of unsaturated hydrocarbons including aromatic groups because olefins and aromatics are hydrogenated together.

On the other hand, it is known that noble metal catalysts such as palladium (Pd) and platinum (Pt) are used to selectively hydrogenate olefins in aromatic unsaturated hydrocarbons. Of the noble metal catalysts, the palladium catalyst is mainly used as the selective hydrogenation catalyst due to its excellent activity and selectivity, compared with other metal catalysts. However, the palladium catalyst has a problem in that, when hydrogenation is carried out in a liquid phase, palladium is lost and a Pd complex compound is formed.

Therefore, in order to solve this problem, the development of various catalysts for a hydrogenation reaction are actively in progress.

Korean Patent Publication No. 10-2019-0017229 discloses a partially hydrogenated hydrocarbon resin produced by thermal polymerization of dicyclopentadiene and an olefin-based monomer and then a partial hydrogenation reaction, and a method for producing the same, wherein nickel, palladium, cobalt, platinum, and rhodium are used as catalysts. However, Korean Patent Publication No. 10-2019-0017229 does not disclose the selectivity of the hydrogenation reaction for olefins.

Germany Patent Publication No. 03049414 discloses a catalyst for a hydrogenation reaction, which has a reduction degree of 40-77 when a hydrogenation reaction of an unsaturated organic compound such as cyclooctadiene is performed using a catalyst including an inorganic support such as nickel and silica gel. However, there are some limitations in that the composition of the catalyst and the reactants are limited to the above.

As the non-patent literature, RUSS. CHEM. BULL. INTERNATIONAL EDITION, VOL. 65, NO. 12, PP. 2841-2844 discloses that a selective hydrogenation reaction of 1,3-pentadiene is performed using a nickel-sulfur/silica catalyst. The main purpose is to improve the hydrogenation selectivity of 1,3-pentadiene by adding sulfur. However, the composition of the catalyst is limited to the above, and the control of the reduction degree according to whether or not the passivation layer is removed is not disclosed.

Therefore, the present invention has been made in an effort to provide high aromatic/olefin selectivity of a nickel catalyst in a hydrocarbon resin hydrogenation reaction.

In addition, in the case of a nickel catalyst in an existing hydrogenation reaction, a reduction degree of nickel metal does not exceed 90%, but the present invention has been completed in order to develop high activity by providing a reduction degree of nickel metal in a range of 90% or more when necessary.

DESCRIPTION OF EMBODIMENTS

Technical Problem

The present invention aims to solve the above-described problems.

An object of the present invention is to control a reduction degree of nickel (Ni) metal according to removal of a passivation layer.

Another object of the present invention is to provide a catalyst for a hydrogenation reaction, which has a high content of nickel and a small crystallite size of nickel while improving dispersibility and activity.

Another object of the present invention is to selectively hydrogenate olefins by changing relative hydrogenation rates of olefins and aromatics in a hydrogenation reaction of an unsaturated hydrocarbon compound including an aromatic group due to the inclusion of sulfur in a nickel-supported catalyst as a promoter.

In addition, the present invention aims to easily produce a water-white resin by controlling an aromatic content in a hydrocarbon resin hydrogenation reaction.

Solution to Problem

In order to achieve the above-described objects of the present invention and achieve the characteristic effects of the present invention described below, the characteristic construction of the present invention is as follows.

According to an embodiment of the present invention, there is provided a catalyst for a hydrogenation reaction, which includes an active ingredient, a promoter, and a support.

More specifically, there is provided a catalyst for a hydrogenation reaction, which includes 0.05-10 parts by weight of at least one first promoter selected from copper and copper oxide, 3-15 parts by weight of at least one second promoter selected from sulfur and sulfur oxide, and 10-50 parts by weight of a silica carrier as a support, based on 40-90 parts by weight of at least one active ingredient selected from nickel and nickel oxide, wherein a reduction degree of the active ingredient is controllable according to a removal of a passivation layer.

According to an embodiment of the present invention, the reduction degree of the active ingredient may be 90% or more when the passivation layer is removed, and may be 45% or more when the passivation layer is not removed.

In addition, the reduction degree of the active ingredient may be measured by hydrogen-temperature program reduction ($H_2$-TPR).

According to an embodiment of the present invention, the nickel may form a precipitate with the copper and the sulfur, may be supported on the silica carrier, and may be deposited and precipitated.

On the other hand, a method for producing a catalyst for a hydrogenation reaction according to an embodiment of the present invention includes the steps of: (a) preparing a first solution by dissolving 0.05-10 parts by weight of copper oxide and 10-50 parts by weight of a silica carrier in a solvent, based on 40-90 parts by weight of nickel oxide; (b) adding the first solution to a precipitation container and heating the first solution to a temperature of 60-100° C. while stirring; (c) preparing a second solution by mixing a pH control agent and 3-15 parts by weight of sulfur oxide, and adding the second solution dropwise to the heated first solution to prepare a precipitate; (d) washing and filtering the precipitate and drying the precipitate at a temperature of 100-200° C. for 5-24 hours to prepare a dried product; (e) calcining the prepared dried product in an air atmosphere; and (f) reducing the dried product in a hydrogen atmosphere at a temperature of 200-500° C. to prepare a reduced product.

According to an embodiment of the present invention, the method may further include, after the step (f), passivating the reduced product to form a passivation layer.

According to an embodiment, the reduced product may be passivated with a nitrogen mixed gas including 0.1-20% oxygen, or may be passivated by directly depositing the reduced product in an organic solvent. As the organic solvent, D40 Exxsol may be used. Any organic solvent capable of blocking air may be used.

In addition, according to an embodiment of the present invention, there is provided a hydrogenation method for contacting a hydrocarbon resin with hydrogen in the presence of the catalyst produced by the method described above.

Advantageous Effects of Disclosure

A catalyst for a hydrogenation reaction according to the present invention has an effect that a reduction degree of nickel metal is controlled according to whether or not a passivation layer is removed.

The present invention has an effect of providing a catalyst for a hydrogenation reaction, which is produced according to a deposition-precipitation (DP) method including a promoter, so that the catalyst has a small crystallite size of nickel and improved dispersibility while including a high content of nickel, thereby improving activity.

According to the present invention, since sulfur is included as a promoter, olefins are selectively hydrogenated by significantly reducing a rate of aromatic hydrogenation relative to olefins in a hydrogenation reaction of an unsaturated hydrocarbon compound including an aromatic group. Therefore, it is possible to control the aromatic content of the unsaturated hydrocarbon compound including the aromatic group.

In addition, the present invention has an effect of easily producing a water-white resin by controlling an aromatic content in a hydrocarbon resin hydrogenation reaction.

BRIEF DESCRIPTION OF DRAWING

FIG. 1 shows the result values of hydrogen-temperature program reduction ($H_2$-TPR) graphs according to Examples 1 and 2 of the present invention.

BEST MODE

The present invention will be described with reference to specific embodiments and the accompanying drawings. The embodiments will be described in detail in such a manner that the present invention can be carried out by those of ordinary skill in the art. It should be understood that various embodiments of the present invention are different from each other, but need not be mutually exclusive. For example, certain shapes, structures, and features described herein may be implemented in other embodiments without departing from the spirit and scope of the present invention in connection with one embodiment. In addition, it should be understood that the locations or arrangement of individual components in the embodiments can be changed without departing from the spirit and scope of the present invention. Therefore, the following detailed description is not to be taken in a limiting sense, and the scope of the present invention is to be limited only by the appended claims and the entire scope of equivalents thereof, if properly explained.

Hereinafter, embodiments of the present invention will be described with reference to the accompanying drawings, so that those of ordinary skill in the art can easily carry out the present invention.

In general, a nickel-based catalyst for a hydrogenation reaction is provided in order to improve the quality of a hydrocarbon resin produced by polymerization of dicyclopentadiene (DCPD) as a main raw material. A DCPD hydrocarbon resin has a yellow color due to unsaturated bonds remaining after polymerization (unsaturated bonds of olefins and aromatics), has a foul odor, and is easily oxidized in air. In order to improve the quality of these hydrocarbon resins, when a hydrogenation reaction is performed using a nickel (Ni) catalyst, and preferably a nickel powder catalyst, under high temperature and high pressure conditions, a colorless, odorless, and transparent water-white hydrocarbon resin with improved thermal stability, from which unsaturated bonds are removed, may be produced.

According to an embodiment of the present invention, a catalyst for a hydrogenation reaction includes an active ingredient, a promoter, and a support, the catalyst including 0.05-10 parts by weight of at least one first promoter selected from copper and copper oxide, 3-15 parts by weight of at least one second promoter selected from sulfur and sulfur oxide, and 10-50 parts by weight of a silica carrier as the support, based on 40-90 parts by weight of at least one active ingredient selected from nickel and nickel oxide, wherein a reduction degree of the active ingredient is controllable according to removal of a passivation layer.

According to an embodiment of the present invention, the reduction degree of nickel of the active ingredient is controlled according to whether or not the passivation layer of the catalyst is removed.

In general, the presence of the passivation layer may affect the reduction degree of nickel metal because the passivation layer interferes with an electrochemical reaction. Therefore, the reduction degree of nickel metal may be controlled by removing the passivation layer when necessary.

That is, when the passivation layer is removed, the reduction degree of nickel is 90% or more, and preferably 90-97%, and when the passivation layer is not removed, the reduction degree of nickel is 45% or more, and preferably 45-70%. When the reduction degree of nickel is high, activity may be increased, catalyst life may be improved, and the efficiency of the process of separating the product and the catalyst may be effectively improved. On the other hand, when the reduction degree of nickel is low, catalyst activity and catalyst life may be reduced. Therefore, when necessary, the reduction degree of nickel may be controlled according to whether or not the passivation layer is removed.

In addition, according to an embodiment of the present invention, the reduction degree of nickel is measured by hydrogen-temperature program reduction ($H_2$-TPR). The $H_2$-TPR evaluates the reducing ability of catalyst particles.

In particular, when the passivation layer is removed, the reduction degree of nickel metal in the catalyst according to the present invention is 90% or more, whereas the reduction degree of nickel metal in a known catalyst for a hydrocarbon resin hydrogenation reaction does not exceed 90%. A reduction degree analysis method is as follows.

[Reduction Degree Analysis Method]

1) Reduction degree of catalytic nickel without passivation layer

=(②-①)/②×100

2) Reduction degree of catalytic nickel with passivation layer

=(②-③)/②×100

① Analysis Method
Catalyst pretreatment
He flows and temperature is raised to 300° C.
$H_2$ flows and temperature is maintained at 300° C. for 45 minutes
He flows and cooling analysis is performed at 30° C.
$H_2$-TPR analysis
Gas to be analyzed: $H_2$/Ar mixed gas
Flow rate: 5% $H_2$ in Ar
Temperature: Raising temperature to 900° C.

② Analysis Method
Catalyst pretreatment
He flows and temperature is raised to 300° C.
$H_2$ flows and temperature is maintained at 300° C. for 45 minutes.
He flows and temperature is raised to 400° C.
$O_2$ flows and temperature is maintained at 400° C. for 2 hours.
Cooling to 60° C.
$H_2$-TPR Analysis
Gas to be analyzed: $H_2$/Ar mixed gas
Flow rate: 5% $H_2$ in Ar
Temperature: Raising temperature to 900° C.

③ Analysis Method
$H_2$-TPR Analysis
Gas to be analyzed: $H_2$/Ar mixed gas
Flow rate: 5% $H_2$ in Ar
Temperature: Raising temperature to 900° C.

According to an embodiment of the present invention, the active ingredient has an average crystallite size of 3-10 nm, preferably 3-8 nm, and more preferably 3-7 nm. Compared with a catalyst according to a producing method such as an existing coprecipitation method, the catalyst according to the present invention can control the crystallite size of nickel to 3-10 nm g according to the DP method and maintain high dispersibility. When the average crystallite size of nickel is out of the above range, catalyst activity may be lowered. Therefore, the average crystallite size of nickel is preferably provided in the range of 3-10 nm.

According to an embodiment of the present invention, a nickel source (precursor) may include nickel and metal salts such as oxide, nitrate, acetate, sulfate, chloride, etc., and most preferably a nickel sulfate precursor including sulfate.

In addition, as copper and sulfur sources (precursors), a state of being bonded to metal salts such as oxide, nitrate, acetate, sulfate, chloride, or a combination thereof is used. Preferably, sodium sulfide or copper sulfate is provided. Furthermore, a precipitant such as sodium carbonate or sodium hydrogen carbonate may be provided, but the present invention is not limited thereto.

According to an embodiment of the present invention, the catalyst has an average particle size ($d_{50}$) of 3-10 μm, and a proportion of catalyst particles having a particle size of 1 μm or less in a particle size distribution is 0.1-10%. In this case, the average particle size means a diameter. Due to these physical properties, catalyst activity may be increased, catalyst life may be improved, and the efficiency of the process of separating the product and the catalyst may be improved. When the average particle size of the catalyst is less than 3 μm, filterability of the catalyst may be insufficient, and when the average particle size of the catalyst is greater than 10 μm, the catalyst activity may be lowered. Therefore, when the particle size of the catalyst is provided in the above range, it is possible to prevent the filterability from being deteriorated by blocking the pores of the filter in the hydrogenation reaction process.

According to an embodiment of the present invention, the catalyst has a specific surface area of 150-300 $m^2$/g. When the specific surface area in the above range is provided in the hydrogenation reaction, an effect of contributing to improving catalyst activity may be provided.

According to an embodiment of the present invention, the silica carrier has a specific surface area of 200-400 $m^2$/g, and preferably 300-350 $m^2$/g, and the pores have a size of 3-10 nm. Therefore, an effect of improving the efficiency of the process of separating the product and the catalyst may be optimally provided.

Since silica having a uniform particle size distribution is applied as the carrier, the particle size distribution of the catalyst produced thereby is also uniform, and the size may also be controlled, thereby providing an effect of suppressing the crushing of particles during high-speed rotation. Due to this, it is possible to prevent a decrease in filterability due to a decrease in the proportion of particles having a size of 1 μm or less. Therefore, when the physical properties of the silica carrier are within the above range, the above range is preferable because excellent activity effects of nickel, copper and sulfur are provided.

According to an embodiment of the present invention, the nickel forms a precipitate with the copper and the sulfur, is supported on the silica carrier, and is deposited and precipitated.

In the DP method, a metal precursor salt solution and a pH control agent react in a carrier dispersion to form a precipitate, and this is adsorbed and solidified on the surface of the carrier. It was confirmed that the uniformity of the catalyst was incomparable, compared with metal catalysts produced by an existing coprecipitation method and impregnation method. Therefore, when the catalyst is produced by the DP method using silica having a uniform particle size distribution as the carrier, it is easy to optimize by selecting a carrier having a particle size, size distribution, surface area, pore structure, etc. suitable for the reaction.

On the other hand, the nickel catalyst has excellent catalyst activity in the hydrogenation reaction; however, in the DP method that causes the deposition-precipitation in a state of being supported on the silica carrier, when a high content of nickel is supported, the crystallite size of nickel is increased and the dispersibility is deteriorated, thus lowering the activity. In order to prevent this problem, when the content of nickel is reduced, the dispersibility is relatively improved, but the catalyst activity is lowered. Thus, it was difficult to commercialize the nickel catalyst by the DP method. In addition, the existing DP method provides the activation of the catalyst by performing a reduction reaction at a high temperature exceeding 450° C.

In this regard, in the present invention, copper (Cu) is added to nickel as a promoter and a catalyst composition is supported on a carrier by a DP method. Thus, it is possible to obtain a high reduction degree of nickel at a lower temperature than an existing known method. Even when supported by the DP method, the nickel content is high, the crystallite size of nickel is small, and a degree of dispersion after reduction is high. Therefore, it is possible to provide a catalyst having excellent activity in a hydrogenation reaction. That is, it is possible to optimize a process of producing a catalyst having physical properties such as a particle size, size distribution, specific surface area, and pore structure suitable for the reaction and having a reduction degree of nickel metal in a range of 90% or more.

In addition, according to an embodiment of the present invention, when a nickel powder catalyst including sulfur (S) is used for a DCPD hydrocarbon resin hydrogenation reaction, it is possible to provide an effect of increasing the selectivity to olefins relative to aromatics.

According to an embodiment of the present invention, the hydrogenation reaction using the catalyst according to the present invention has higher selectivity to olefins relative to aromatics.

In particular, the hydrocarbon resin has an aromatic/olefin hydrogenation ratio of 0.1-1.0 after the hydrogenation reaction.

The existing nickel catalyst has low selectivity to olefins relative to aromatics. However, in the present invention, sulfur (S) is supported together with nickel to greatly reduce the hydrogenation rate of aromatics relative to olefins during the hydrogenation reaction of the unsaturated hydrocarbon compound including the aromatic group. Therefore, it is possible to provide an effect of increasing the selectivity to olefins relative to aromatics. After the hydrogenation reaction of olefin-based unsaturated hydrocarbons, the hydrocarbon resins including aromatic moieties have higher compatibility with base polymers such as styrene-isoprene-styrene (SIS) and styrene-butadiene-styrene (SBS), compared with hydrocarbon resins including no aromatic moieties.

According to an embodiment of the present invention, the reactant in the hydrogenation reaction is a hydrocarbon resin.

According to an embodiment of the present invention, the hydrocarbon resin that is the reactant in the hydrogenation reaction may include dicyclopentadiene (DCPD). In addition, it is possible to provide a hydrocarbon resin including $C_5$ fraction obtained from naphtha. Furthermore, it is possible to provide a hydrocarbon resin including $C_9$ fraction. The hydrocarbon resin may include $C_5$ fraction by-product, $C_9$ fraction by-product, DCPD fraction by-product, and a combination thereof, and may include cyclic diene and benzene functional groups. However, the present invention is not limited thereto.

The hydrogenation catalyst according to the present invention may be in the form of powder, particles, or granules. The hydrogenation catalyst according to the present invention may be preferably provided in the form of powder.

According to an embodiment of the present invention, the hydrocarbon resin has an APHA value of 30 or less after the hydrogenation reaction.

APHA color is referred to as Hazen scale or cobalt (Pt/Co) scale, and the color of hydrogenated hydrocarbon resin is analyzed using APHA value by a color standard analysis method (ASTM D1209). The standard is a platinum-cobalt stock solution, which corresponds to APHA 500. The color is expressed as a numerical value subdivided into steps 1 to 500 using a quantitatively diluted standard solution. D.I water used as a diluent corresponds to APHA 0. Since APHA color is particularly correlated with yellowness index, an APHA color value of a measurement sample can be obtained by using an APHA color standard curve of the standard solution for yellowness.

When the color of the hydrocarbon resin is 30 or less, the hydrocarbon resin becomes a water-white resin with almost no color and odor of the hydrocarbon resin, and the remaining olefin content (NMR % area) is less than 0.1%. Therefore, when the catalyst for the hydrogenation reaction according to the present invention is used, the selectivity to olefins relative to aromatics may be improved.

On the other hand, the present invention provides a method for producing a catalyst for a hydrogenation reaction. The method for producing the catalyst for the hydrogenation reaction according to an embodiment of the present invention includes the steps of: (a) preparing a first solution by dissolving 0.05-10 parts by weight of copper oxide and 10-50 parts by weight of a silica carrier in a solvent based on 40-90 parts by weight of nickel oxide; (b) adding the first solution to a precipitation container and heating the first solution to a temperature of 60-100° C. while stirring; (c) preparing a second solution by mixing a pH control agent and 3-15 parts by weight of sulfur oxide, and adding the second solution dropwise to the heated first solution to prepare a precipitate; (d) washing and filtering the precipitate and drying the precipitate at a temperature of 100-200° C. for 5-24 hours to prepare a dried product; (e) calcining the prepared dried product in an air atmosphere; and (f) reducing the dried product in a hydrogen atmosphere at a temperature of 200-500° C. to prepare a reduced product.

A nickel feedstock precursor in the step (a) may include a nickel sulfate precursor including nicel and metal salts such as oxide, nitrate, acetate, sulfate, chloride, or a combination thereof, and preferably sulfate. In addition, as copper and sulfur feedstock precursors, a state of being bonded to metal salts such as oxide, nitrate, acetate, sulfate, chloride, or a combination thereof is used. Preferably, sodium sulfide or copper sulfate is provided. Furthermore, a precipitant such as sodium carbonate or sodium hydrogen carbonate may be provided.

In addition, the step of calcining the dried product prepared in the step (e) in the air atmosphere is not necessarily provided, and those of ordinary skill in the art may appropriately select the step according to necessity. In addition, the optimal activity may be exhibited at a temperature of 200-500° C., preferably 300-450° C., and more preferably 370-430° C. The temperature of the hydrogen atmosphere may also be 200-500° C. Accordingly, there is a calcining and reducing effect.

According to an embodiment of the present invention, after the step (f), the method may further include the step of passivating the reduced product to form a passivation layer.

The step of passivating the reduced product to form the passivation layer may include passivating the reduced product with a nitrogen mixed gas including 0.1-20% oxygen, or may include passivating the reduced product by immersing the reduced product in a solution including an organic solvent.

In the case of passivating the reduced product with the gas, % in the 0.1-20% oxygen refers to volume %. For example, D40 Exxsol may be used as the organic solvent. The organic solvent capable of blocking air may be used without limitation.

According to an embodiment of the present invention, when the passivation layer is removed, the reduction degree of nickel may be 90% or more, and when the passivation layer is not removed, the reduction degree of nickel may be 45% or more. A reduction degree of 90% or more is provided by removing the passivation layer, thereby increasing catalyst activity and increasing catalyst life. In addition, when it is unnecessary to increase catalyst activity, the passivation layer is not removed. In this manner, the reduction degree may be controlled as necessary.

According to an embodiment of the present invention, when the precipitate is prepared in the step (c), pH is 7 to 9. The precipitation of the catalyst precursor may be performed in an environment of pH 7 or higher by the addition of a base or by an electrochemical means. In this case, a basic compound may be added for the addition of the base. The basic compound may include sodium carbonate, sodium hydroxide, sodium hydrogen carbonate, ammonia, or a hydrate thereof, and preferably sodium carbonate or a hydrate thereof, but the present invention is not limited thereto.

According to the present invention, there is provided a hydrogenation method for contacting a hydrocarbon resin with hydrogen in the presence of the catalyst for the hydrogenation reaction produced by the above-described producing method.

The hydrocarbon resin may be hydrogenated at a temperature of 100-400° C., and preferably 200-300° C., and at a pressure of 1-200 bar, and preferably 30-100 bar. A hydrogenation time may depend primarily on the temperature, the amount of catalyst, and the degree of hydrogenation.

A hydrogenation reaction may be carried out in various reactors. Preferably, the hydrogenation reaction may be carried out in a continuous stirred tank reactor (CSTR) or a loop reactor. In addition, the optimal activity may be exhibited when a reduction temperature is 200-500° C., and preferably 350-450° C., as described above.

According to the present invention, the hydrocarbon resin that is the reactant in the hydrogenation reaction may include dicyclopentadiene (DCPD). In addition, a hydrocarbon resin including C5 fraction may be provided, and a hydrocarbon resin including C9 fraction may be provided.

Hereinafter, the structure and operation of the present invention will be described in more detail with reference to preferred examples of the present invention. However, these examples are shown by way of illustration and should not be construed as limiting the present invention in any sense.

Since contents not described herein can be sufficiently technically inferred by those of ordinary skill in the art, descriptions thereof will be omitted.

Example 1

20 g of a porous silica powder having a surface area of 310 m$^2$/g and a pore size of 30 nm, 246 g of nickel sulfate, 3 g of copper sulfate, and 1,000 mL of distilled water were added to a precipitation container, stirred, and heated to a temperature of 80° C. After the temperature reached 80° C., 750 mL of a solution including 131 g of sodium carbonate and 9.6 g of sodium sulfide was all injected within 1 hour by using a syringe pump. After completion of precipitation, a slurry had a pH of 7.7, was washed with about 10 L of distilled water, filtered, and then dried at 100° C. for 12 hours or more by using a drying oven. This was subdivided and calcined at a temperature of 400° C. in an air atmosphere. After this was subdivided again, the reduction was performed at a temperature of 400° C. in a hydrogen atmosphere. After the reduction, the powder was passivated using a nitrogen mixed gas including 1% oxygen to produce a hydrogenation catalyst.

Based on the weight of the catalyst, an active ingredient content of the passivated catalyst was measured as 73.6 parts by weight, a weight of a second promoter was measured as 4.5 parts by weight, a weight of a first promoter was measured as 1.03 parts by weight, and an average size of nickel crystals was measured as 4.0 nm. A BET specific surface area was 235 m$^2$/g, a total pore volume was 0.32 m$^3$/g, and an average pore size was 5.5 nm. A nickel (Ni) reduction degree of the catalyst without a passivation layer, which was analyzed by H$_2$-TPR, was 96%, and a nickel (Ni) reduction degree of the catalyst with a passivation layer was 50%. The results thereof are shown in FIG. 1. In FIG. 1, A shows a Ni content analysis H$_2$-TPR graph with a passivation layer in Example 1, and B shows an unreduced Ni content analysis H$_2$-TPR graph without a passivation layer in Example 1. In addition, D shows a total Ni content analysis H$_2$-TPR graph in Example 1.

A hydrogenation reaction for a catalyst activity test was carried out at a temperature of 230° C.

Example 2

750 mL of a solution including 131 g of sodium carbonate and 14.5 g of sodium sulfide as a precipitant was all injected within 1 hour by using a syringe pump, so that a second promoter/active ingredient weight ratio of a hydrogenation catalyst was 9.7. After completion of precipitation, a slurry has a pH of 7.6. The other processes such as washing, filtering, and drying were the same as those in Example Based on the weight of the catalyst, an active ingredient content of a passivated catalyst was measured as 74.0 parts by weight, a weight of a second promoter was measured as 7.2 parts by weight, a weight of a first promoter was measured as 0.96 parts by weight, and an average size of nickel crystals was measured as 4.5 nm. A BET specific surface area was 250 m²/g, a total pore volume was 0.33 m³/g, and an average pore size was 5.3 nm. The nickel (Ni) reduction degree of the catalyst without the passivation layer, which was analyzed by $H_2$-TPR, was 94%, and the nickel (Ni) reduction degree of the catalyst with the passivation layer was 48%. The results thereof are shown in FIG. 1. In FIG. 1, C shows an unreduced Ni content analysis $H_2$-TPR graph without a passivation layer in Example 2.

A hydrogenation reaction for a catalytic activity test was carried out at a temperature of 230° C.

Example 3

750 mL of a solution including 131 g of sodium carbonate and 19.1 g of sodium sulfide as a precipitant was all injected within 1 hour by using a syringe pump, so that a second promoter/active ingredient weight ratio of a hydrogenation catalyst was 12.7. After completion of precipitation, a slurry has a pH of 7.5. The other processes such as washing, filtering, and drying were the same as those in Example Based on the weight of the catalyst, an active ingredient content of a passivated catalyst was measured as 74.7 parts by weight, a weight of a second promoter was measured as 9.5 parts by weight, a weight of a first promoter was measured as 0.94 parts by weight, and an average size of nickel crystals was measured as 6.1 nm. A BET specific surface area was 245 m²/g, a total pore volume was 0.32 m³/g, and an average pore size was 5.2 nm. The nickel (Ni) reduction degree of the catalyst without the passivation layer, which was analyzed by $H_2$-TPR, was 97%, and the nickel (Ni) reduction degree of the catalyst with the passivation layer was 59%.

A hydrogenation reaction for a catalyst activity test was carried out at a temperature of 230° C.

Comparative Example 1

A typical known hydrogenation catalyst was prepared without using sodium sulfide. The hydrogenation catalyst of Comparative Example 1 was prepared in the same manner as in Example 1.

Based on the weight of the catalyst, an active ingredient of a passivated catalyst was 80.4 parts by weight, and a first promoter was 1.0 parts by weight. Although sodium sulfide was not used, it was confirmed that, as $NiSO_4$ was used as a nickel raw material, a slight amount (0.5 parts by weight) of sulfur oxide ($SO_4$) remained.

An average size of the nickel crystals was measured as 3.9 nm. A BET specific surface area was 250 m²/g, a total pore volume was 0.36 m³/g, and an average pore size was 5.6. A nickel (Ni) reduction degree of the catalyst without a passivation layer, which was analyzed by $H_2$-TPR, was 85%. A nickel (Ni) reduction degree of the catalyst with a passivation layer was 42%.

A hydrogenation reaction for a catalyst activity test was carried out at a temperature of 230° C.

Comparative Example 2

A typical known hydrogenation catalyst was prepared without using sodium sulfide. The hydrogenation catalyst of Comparative Example 1 was prepared in the same manner as in Example 1.

However, after calcination at 400° C., the reduction was performed at a temperature of 300° C. in a hydrogen atmosphere. Based on the weight of the catalyst, an active ingredient content of a passivated catalyst was measured as 81.1 parts by weight, a weight of a second promoter was measured as 0.3 parts by weight, a weight of a first promoter was measured as 0.97 parts by weight, and an average size of nickel crystals was measured as 3.3 nm.

A BET specific surface area was 210 m²/g, a total pore volume was 0.30 m³/g, and an average pore size was 5.2 nm. A nickel (Ni) reduction degree of the catalyst without a passivation layer, which was analyzed by $H_2$-TPR, was 72%, and a nickel (Ni) reduction degree of the catalyst with a passivation layer was 50%.

A hydrogenation reaction for a catalyst activity test was carried out at a temperature of 230° C.

Table 1 below shows the components in the catalyst compositions of Examples and Comparative Examples.

TABLE 1

| Classification | Unit | Example 1 | Example 2 | Example 3 | Comparative Example 1 | Comparative Example 2 |
|---|---|---|---|---|---|---|
| Ni reduction degree of catalyst without passivation layer | % | 96 | 94 | 97 | 85 | 72 |
| Ni reduction degree of catalyst with passivation layer | % | 50 | 48 | 59 | 42 | 50 |
| Ni crystallite size | nm | 4.0 | 4.5 | 6.1 | 3.9 | 3.3 |
| Active ingredient | pars by weight | 73.6 | 74.0 | 74.7 | 80.4 | 81.1 |
| First promoter | pars by weight | 1.03 | 0.96 | 0.94 | 1.0 | 0.97 |
| Second promoter | pars by weight | 4.5 | 7.2 | 9.5 | 0.5 | 0.3 |
| $SiO_2$ | pars by weight | 18.0 | 18.1 | 17.7 | 17.7 | 18.2 |
| BET specificSurface area | m²/g | 235 | 250 | 245 | 250 | 210 |
| Total poreVolume | cm³/g | 0.32 | 0.33 | 0.32 | 0.36 | 0.30 |
| Mean pore diameter | nm | 5.5 | 5.3 | 5.2 | 5.6 | 5.2 |

Experimental Example 1 Catalyst Activity Test

A 300 mL autoclave including a hollow shaft stirrer and having a stirring speed of 1,600 rpm was used. 75 g of a solution, in which 30 wt % of a non-hydrogenated hydrocarbon resin was dissolved in Exxsol™ D40, was hydrogenated for 1 hour by adding a catalyst (Catal/DCPD resin) of 0.5-1% relative to the mass of the hydrocarbon resin at 230° C. and $H_2$ 90 bar. The color of the hydrocarbon resin solution after the hydrogenation was measured by ASTM D1209.

The color of the hydrocarbon resin (APHA value, standard representing the color of the solution) significantly proportional to the content of olefin in the hydrocarbon resin was 750 before hydrogenation, and the aromaticity was 18%.

The aromaticity was analyzed by $^1$H NMR.

TABLE 2

| Classification | Reaction temperature (° C.) | Catalyst (kg-cat/ kg-resin) | Aromatic/olefin hydrogenation ratio (%) | APHA value |
| --- | --- | --- | --- | --- |
| Example 1 | 230 | 0.01 | 0.5 | 2 |
| Example 2 | 230 | 0.01 | 0.3 | 3 |
| Example 3 | 230 | 0.01 | 0.2 | 2 |
| Comparative Example 1 | 230 | 0.005 | 2.4 | 7 |
| Comparative Example 2 | 230 | 0.005 | 1.7 | 10 |

The results of the hydrogenation reaction under the conditions described in Table 2 in accordance with Experimental Example 1 are shown in Table 2.

According to the results of the hydrogenation reaction of Comparative Examples 1 and 2, the aromatic/olefin hydrogenation ratio was high and the olefin selectivity was low. On the other hand, when Examples 1 to 3 were used, it was confirmed that the APHA values were similar to each other, but olefin was preferentially hydrogenated, and thus the aromaticity was selectively controllable. When the Ni reduction degree of the catalyst without the passivation layer, which was analyzed by $H_2$-TPR, is at least 90% and the Ni reduction degree of the catalyst with the passivation layer is at least 45%, it can be confirmed that the aromatic/olefin selectivity is high.

In addition, when the color of the hydrocarbon resin is 30 or less, the hydrocarbon resin becomes a water-white resin. At this time, the content of the remaining olefin (NMR % area) is less than 0.1%. Therefore, it is confirmed that Examples 1 to 3 can provide an excellent catalyst capable of providing a water-white hydrocarbon resin through a hydrogenation reaction.

While the present invention has been described by particular matters such as specific components and limited embodiments and drawings, this is provided only for helping the comprehensive understanding of the present invention. The present invention is not limited to the above-described embodiments, and it will be understood by those of ordinary skill in the art that various modifications and variations can be made thereto without departing from the scope of the present invention.

Therefore, it will be understood that the spirit of the present invention should not be limited to the above-described embodiments and the claims and all equivalent modifications fall within the scope of the present invention.

The invention claimed is:

1. A catalyst for a hydrogenation reaction, comprising: 0.05-10 parts by weight of at least one first promoter selected from copper and copper oxide, 3-15 parts by weight of at least one second promoter selected from sulfur and sulfur oxide, and 10-50 parts by weight of a silica carrier as a support, based on 40-90 parts by weight of at least one active ingredient selected from nickel and nickel oxide,
   wherein a reduction degree of the at least one active ingredient is controllable according to a removal of a passivation layer,
   wherein the reduction degree of the at least one active ingredient is 90% or more when the passivation layer is removed, and is 45% or more when the passivation layer is not removed.

2. The catalyst for a hydrogenation reaction of claim 1, wherein the reduction degree of the at least one active ingredient is measured by hydrogen-temperature program reduction ($H_2$-TPR).

3. The catalyst for a hydrogenation reaction of claim 1, wherein the at least one active ingredient has an average crystallite size of 3-10 nm.

4. The catalyst of claim 1, wherein the catalyst has an average particle size ($d_{50}$) of 3-10 μm, and a proportion of catalyst particles having a particle size of 1 μm or less in a particle size distribution is 0.1-10% by volume.

5. The catalyst for a hydrogenation reaction of claim 1, wherein the catalyst has a specific surface area of 150-300 $m^2/g$.

6. The catalyst for a hydrogenation reaction of claim 1, wherein the silica carrier has a specific surface area of 200-400 $m^2/g$ and a pore size of 3-10 nm.

7. The catalyst for a hydrogenation reaction of claim 1, wherein the nickel forms a precipitate with the copper and the sulfur, is supported on the silica carrier, and is deposited and precipitated.

8. The catalyst for a hydrogenation reaction of claim 1, wherein a reactant in the hydrogenation reaction is a hydrocarbon resin.

9. The catalyst for a hydrogenation reaction of claim 8, wherein the hydrocarbon resin is at least one selected from a group consisting of a hydrocarbon resin including dicyclopentadiene (DCPD), a hydrocarbon resin including C5 fraction, and a hydrocarbon resin including C9 fraction.

10. The catalyst for a hydrogenation reaction of claim 8, wherein the hydrocarbon resin has an APHA value of 30 or less after the hydrogenation reaction.

11. The catalyst for a hydrogenation reaction of claim 8, wherein the hydrocarbon resin has an aromatic/olefin hydrogenation ratio of 0.1-1.0 after the hydrogenation reaction.

12. A catalyst for a hydrogenation reaction, comprising:
   0.05-10 parts by weight of at least one first promoter selected from copper and copper oxide, 3-15 parts by weight of at least one second promoter selected from sulfur and sulfur oxide, and 10-50 parts by weight of a silica carrier as a support, based on 40-90 parts by weight of at least one active ingredient selected from nickel and nickel oxide,
   wherein a reduction degree of the at least one active ingredient is controllable according to a removal of a passivation layer,
   wherein the catalyst has an average particle size ($d_{50}$) of 3-10 μm, and a proportion of catalyst particles having a particle size of 1 μm or less in a particle size distribution is 0.1-10% by volume.

* * * * *